Patented Dec. 12, 1950

2,533,455

UNITED STATES PATENT OFFICE 2,533,455

PROCESS FOR PREPARING LINEAR CONDENSATION POLYMERS FROM BIS-DIAZO-DIKETO ALKANES

Hugh J. Hagemeyer, Jr., Kingsport, Tenn., assignor to Eastman Kodak Company, Rochester, N. Y., a corporation of New Jersey No Drawing. Application September 10, 1947, Serial No. 773,296

4 Claims. (Cl. 260—65)

This invention relates to the preparation of high molecular weight linear superpolymers and more particularly it relates to a new method of forming such linear polymers, and to the production of fiber-forming materials.

In accordance with a broad concept of my invention, I have found that valuable condensation products may be formed by reacting bis-diazo-diketo alkanes with any bifunctional compound containing hydroxyl amino and/or carboxyl groups, e. g. diamines, hydroxy amines, glycols, dihydric phenols, amino acids, hydroxy acids, dibasic acids and mixtures thereof. The various synthetic linear condensation polymers produced in accordance with the present invention are adaptable for the production of fibers which are strong and elastic, and which are capable of a high degree of orientation along the fiber axis. The objects of the invention will be apparent from the following description and examples of the invention.

Heretofore various linear condensation polymers have been described in detail in the scientific and patent literature. By the application of prior art methods of propagating linear condensation polymers, a moderately high molecular weight polymer may be obtained. By further treatment of this polymer in a molecular still under high vacuum superpolymers may be obtained. Many of these prior art methods are based on the reaction of compounds containing carboxyl groups and may involve reactions such as esterification, amide formation or anhydride formation which being reversible reactions must be forced to completion by the separation of the reaction products as they are formed.

My new method of forming high molecular weight superpolymers has the advantage of producing only a gaseous by-product, nitrogen. The gradual release of nitrogen as the molten mass is heated also effects a continuous agitation of the mixture which is beneficial to the reaction. A further advantage is the greater reactivity of the ketene groups which are produced by heating the diazoketones as compared with the lesser reactivity of the carboxyl groups which are ordinarily present in one of the constituents in this type of linear condensation. This greater reactivity permits a reduction in the time and degree of heating required to form the polymers as compared to prior art methods. Furthermore, because my novel method involves a ketene such as is formed by employing a diazoketone as one of the reacting constituents, nitrogen is the only material liberated and its presence has no effect on the completion of the reaction. Hence, the steps of removing the reaction products from the presence of the reaction in order to cause it to go to completion is eliminated.

The theory underlying my novel method may be described as follows. Linear condensation polymers comprise long chains containing repeated units. Depending on the starting materials the units may be alike or different. Diazoketones will decompose by heating in solution in the presence of a catalyst such as freshly precipitated $Ag_2O$ or platinum wire, to form the corresponding ketene, as shown in the following general formula:

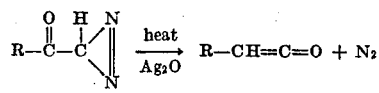

When employing bis-diazodiketoalkanes such as those which may be obtained by reacting adipoyl chloride and diazo methane, a difunctional ketene is obtained:

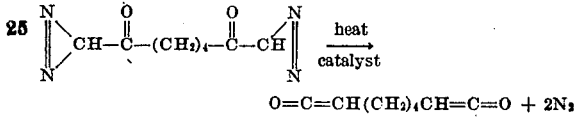

$$O=C=CH(CH_2)_4CH=C=O + 2N_2$$

The bis-diazodiketoalkanes are conveniently prepared according to the method described by Walker, J. Chem. Soc., 1304, (1940) and also by Work, J. Chem. Soc., 1315 (1940). Diazo methane and its derivatives are easily and cheaply prepared by starting with the desired amine hydrochloride and urea following the method described by Arndt, Loewe, and Ovan, Berichte, 73, 606 (1940).

The condensation reaction can be carried out in several ways. However, the preferred method and the one which must be employed in forming linear condensation polymers is to form the ketene in the presence of the material with which it is to react. This is especially true with aldoketenes which have a tendency to polymerize very rapidly. The initial reaction can be carried out in an inert solvent in the presence or absence of catalyst, or the materials to be reacted can be heated to form a melt. With diamines and hydroxy amines the use of catalyst is unnecessary.

Linear condensation polymers formed by the reaction of bis-diazodiketoalkanes with other bifunctional compounds may be of several types. The following are typical reactions in accordance with my invention and are shown by using general formulas.

*Reaction 1.*—Polyesters formed by the action of bisdiazodiketoalkanes on dihydric alcohols.

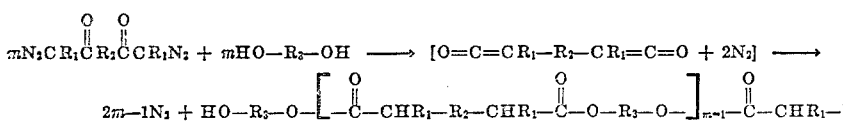

*Reaction 2.*—Polyanhydrides formed by the action of bisdiazodiketoalkanes on dibasic acids.

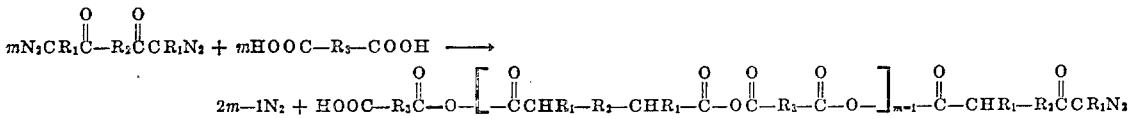

*Reaction 3.*—Polyesteramides formed by the action of bisdiazodiketoalkanes on hydroxyamines.

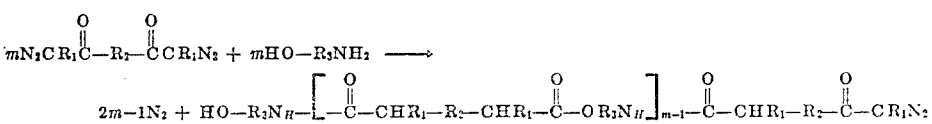

*Reaction 4.*—Polyamides formed by the action of bisdiazodiketoalkanes on diamines.

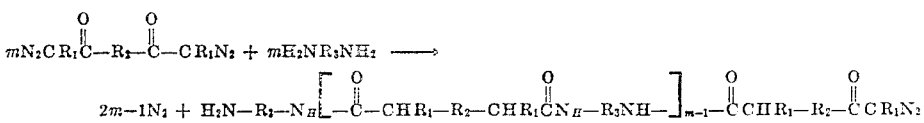

In these formulas, $R_1$ represents a hydrogen atom, an alkyl group, e. g. methyl, ethyl, n-propyl, etc., an aralkyl group, e. g. benzyl, etc. or an aryl group, e. g. phenyl, etc., $R_2$ represents an alkylene group, e. g. ethylene, trimethylene, 1,2-propylene, tetramethylene, hexamethylene, decamethylene, etc., $R_3$ represents an alkylene group, e. g. ethylene, trimethylene, 1,2-propylene, tetramethylene, hexamethylene, decamethylene, etc. or an arylene group, e. g. phenylene, xylylene, etc.

Typical bisdiazodiketoalkanes which may be employed are 1, 12-diazo-2,11 diketododecane made by reacting sebacyl chloride and diazomethane; 1,4-bisdiazoacetyl-n-butane from adipyl chloride and diazomethane, and 1,2-bisdiazoacetyl-n-ethane from succinyl chloride and diazomethane.

Still other bisdiazodiketoalkanes can be formed by using diazoethane, diazobutane, phenyl diazomethane, etc. with the above named chlorides, e. g., diazoethane reacts in accordance with the following formula:

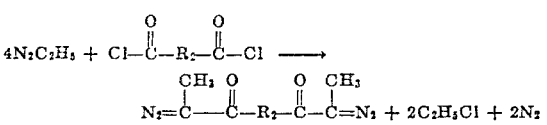

wherein $R_2$ has the values given above.

As indicated in the above general formulas, the bisdiazodiketoalkanes may be reacted with any bifunctional compound containing hydroxyl, amino or carboxyl groups.

In accordance with my invention, the first step of the reaction may be carried out in solution or in a melt. The bisdiazodiketoalkane can be decomposed in an inert solvent such as toluene in the presence of catalytic amounts of freshly precipitated $Ag_2O$ or platinum wire suspended in the solution to form a difunctional ketene which is then added to an aliquot portion of other difunctional reagent to form a linear polymer. To avoid the presence of a large amount of free difunctional ketene in solution at any one time the bisdiazodiketoalkane can be catalytically decomposed in situ by gradually adding the bisdiazodiketoalkane to a solution of the other bifunctional reagent.

Platinum wire is the preferred catalyst because it will cause no contamination of the polymer and simplifies the problem of catalyst recovery. With hydroxy amines and diamines no catalyst is required and a linear polymer is formed simply by heating a solution of the two bifunctional reagents. The solution is filtered and the low molecular weight precipitate is placed in a molecular still where it is heated until the desired molecular weight is obtained.

An alternate procedure which is especially suited to hydroxy amines, and diamines of low melting point, i. e. below 100° C., is to form a melt of the bisdiazodiketoalkane and the hydroxy amine or diamine. The initial reaction is carried out by heating to 90–180° C. at atmospheric pressure. The final stage is carried out in a molecular still at slightly higher temperatures, 180–250° C.

The decomposition temperature of the bisdiazodiketoalkane is very critical. For this reason the solution procedure is generally preferred since it avoids any sudden violent decomposition which leads to cross-linked materials.

The following examples further illustrate my invention:

*Example 1.*—2.56 grams of decamethylene diamine and 4.44 grams of 1,12-diazo-2,11-diketododecane are slowly heated to 140° C. After several hours the temperature is gradually raised to 160° C. When the evolution of nitrogen is barely perceptible the melt is placed in a molecular still and the temperature raised from 180–230° C. gradually over a period of eight hours. The polymer was soluble in hot cresol. It could be drawn into a fiber and necked down on cold drawing.

*Example 2.*—One gram of phenylene diamine and 2.5 grams of 1,12-diazo-2,11-diketododecane are heated at reflux in boiling toluene in presence of $Ag_2O$. The suspension was filtered and the precipitate heated for several minutes in a yellow flame. The melt gave a fiber which could be cold drawn.

*Example 3.*—One gram of ethylene diamine is dissolved in 25 ml. of toluene. Heat to reflux and add 5 grams of 1,12-diazo-2,11-diketododecane dissolved in an inert solvent dropwise. Evaporate off solvent and heat residue in an oil bath up to 180° C. Place in a molecular still and heat 10 hours at 250° C. The product melted in a yellow flame and could be cold drawn.

*Example 4.*—One gram of diethylene glycol and 2.5 grams of 1,12-diazo-2,11-diketododecane were heated to 120° C. in an oil bath. A clear solution was formed and a coil of platinum wire was suspended in the solution. Nitrogen was gradually evolved. A viscous polymer was formed in about 5 minutes. The material was heated in vacuo for four hours. Fibers could be drawn from the resulting polymer.

*Example 5.*—1.5 grams of monoethanol amine were dissolved in 25 ml. of xylene. Heat to reflux and add slowly a solution containing 4.0 grams of 1,4-bisdiazoacetyl-n-butane. Polymer formation was very rapid. The solution was filtered and heated in vacuo 12 hours at 200° C. The fibers which were formed could be cold drawn.

*Example 6.*—Two grams of p-aminophenol are dissolved in 25 cc. of xylene. Heat to reflux and add a solution of 3 grams of 1,4-bisdiazoacetyl-n-butane. Polymer formation was rapid at 120° C. Filter and heat in vacuo. The product could be melted and drawn.

The following dibasic acids may be employed in accordance with my invention as illustrated in Reaction 2: succinic, glutaric, adipic, pimelic and suberic. Various hydroxy amines such as $\gamma$-hydroxy propyl amine, $\delta$-hydroxybutyl amine, $\omega$-hydroxydecylamine may be employed as illustrated in Reaction 3. Diamines such as ethylene diamine, propylene diamine, phenylene diamine, xylylene-diamine etc. may be employed as illustrated in Reaction 4. Dihydric alcohols such as glycol, propylene glycol, trimethylene glycol, diethylene glycol, decamethylene glycol, may be employed as illustrated in Reaction 1. Similarly, hydroquinone, p-aminobenzoic acid, p-hydroxybenzoic acid, $\beta$-hydroxy propionic acid, $\beta$-aminopropionic acid, etc. can be condensed with the bisdiazo diketoalkanes as shown above. In addition to the inert solvent toluene other inert solvents such as benzene, heptane, octane, xylene may be employed when the reactions are carried out in solution.

I claim:

1. A process for preparing a linear condensation polymer comprising condensing a bisdiazodiketoalkane with a compound selected from the group consisting of di-primary amines and hydroxy primary amines.

2. A process for preparing a linear condensation polymer which comprises condensing decamethylene diamine and 1,12-bisdiazo-2,11-diketododecane.

3. A process for preparing a linear condensation polymer which comprises condensing phenylene diamine and 1,12-bisdiazo-2,11-diketododecane.

4. A process for preparing a linear condensation polymer which comprises condensing ethylene diamine and 1,12-bisdiazo-2,11-diketododecane.

HUGH J. HAGEMEYER, JR.

REFERENCES CITED

The following references are of record in the file of this patent:

UNITED STATES PATENTS

| Number | Name | Date |
| --- | --- | --- |
| 2,071,250 | Carothers | Feb. 16, 1937 |
| 2,284,896 | Hanford | June 2, 1942 |

OTHER REFERENCES

Adams et al.: Organic Reactions, vol. I, 1942, pp. 38 to 41, 43 and 45.